(12) United States Patent
Hironaka et al.

(10) Patent No.: US 7,530,310 B2
(45) Date of Patent: May 12, 2009

(54) METAL HOLDER WITH ELECTRODE PIN, METHOD OF MANUFACTURING THE METAL HOLDER, AND GAS GENERATOR

(75) Inventors: Akitoshi Hironaka, Himeji (JP); Yasushi Matsumura, Himeji (JP); Dairi Kubo, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 157 days.

(21) Appl. No.: 10/594,271

(22) PCT Filed: Mar. 30, 2005

(86) PCT No.: PCT/JP2005/006016

§ 371 (c)(1), (2), (4) Date: Sep. 26, 2006

(87) PCT Pub. No.: WO2005/095163

PCT Pub. Date: Oct. 13, 2005

(65) Prior Publication Data

US 2007/0193464 A1    Aug. 23, 2007

(30) Foreign Application Priority Data

Mar. 30, 2004    (JP)    ............................ 2004-100078

(51) Int. Cl.
*F42B 3/10* (2006.01)
*F42B 3/103* (2006.01)
(52) U.S. Cl. .............. 102/202.7; 102/202.8; 102/202.9; 102/202.11

(58) Field of Classification Search .............. 102/202.7, 102/202.8, 202.9, 202.11, 202.14, 275.11, 102/275.12
See application file for complete search history.

(56) References Cited

U.S. PATENT DOCUMENTS 3,971,320 A * 7/1976 Lee .......................... 102/202.9

(Continued)

FOREIGN PATENT DOCUMENTS

EP    1 225 415    7/2002

(Continued)

OTHER PUBLICATIONS

"Variable Output Initiator" Research Disclosure, Mason Publications, vol. 384, No. 19, Apr. 1996, XP007120998, pp. 1-4.

(Continued)

*Primary Examiner*—Bret Hayes
(74) *Attorney, Agent, or Firm*—Oblon, Spivak, McClelland, Maier & Neustadt, P.C.

(57) ABSTRACT

A metal holder, and a method of producing the same, with electrode pins suitably used for a gas generator having a structure that can prevent electrode pins from being burst forth easily even when the gas generator is brought into action under high temperature. The metal holder with electrode pins includes a metal holder and at least two electrode pins for allowing passage of electrical current. Each electrode pin is larger in diameter at its head portion than at its terminal portion. Plastic members are arranged to surround a part of the respective electrode pins circumferentially. Holes for the respective electrode pins to pass through the holder are formed in the holder, and the electrode pins are fixed to the holes via the plastic members, each hole having a diameter-reduction portion at a part thereof.

20 Claims, 10 Drawing Sheets

U.S. PATENT DOCUMENTS

| | | |
|---|---|---|
| 6,289,813 B1 | 9/2001 | Duguet et al. |
| 6,412,817 B2 * | 7/2002 | Patrickson et al. .......... 280/741 |
| 6,418,853 B1 | 7/2002 | Duguet et al. |
| 6,557,474 B1 * | 5/2003 | Morte et al. ............. 102/202.1 |
| 6,672,215 B2 * | 1/2004 | Daoud ................... 102/202.14 |
| 6,761,116 B2 * | 7/2004 | Daoud ................... 102/202.14 |
| 6,823,796 B1 * | 11/2004 | Amano ................. 102/202.14 |

FOREIGN PATENT DOCUMENTS

| | | |
|---|---|---|
| JP | 63 127100 | 5/1988 |
| JP | 10-35400 | 2/1998 |
| JP | 3055652 | 10/1998 |
| JP | 2971439 | 8/1999 |
| JP | 2000-241098 | 9/2000 |
| JP | 2000-241099 | 9/2000 |
| JP | 2001-191891 | 7/2001 |
| JP | 2001 260815 | 9/2001 |
| JP | 2002-90097 | 3/2002 |
| JP | 2002-346371 | 12/2002 |

OTHER PUBLICATIONS

U.S. Appl. No. 10/594,271, filed Sep. 26, 2006, Hironaka, et al.
U.S. Appl. No. 11/578,110, filed Oct. 10, 2006, Matsumura, et al.

* cited by examiner

METAL HOLDER WITH ELECTRODE PIN, METHOD OF MANUFACTURING THE METAL HOLDER, AND GAS GENERATOR

TECHNICAL FIELD

The present invention relates to a metal holder with electrode pins, to a producing method thereof, and to a gas generator having the metal holder, or more particularly, to a gas generator suitable for operating a vehicle occupant restraint system such as an automobile seatbelt pretensioner and the like.

BACKGROUND ART

A seatbelt pretensioner is known as one of the safety systems to protect a vehicle occupant from the shock in a car collision. The seatbelt pretensioner is brought into action by a large amount of high-temperature and high-pressure gas emitted from the gas generator, for the protection of the vehicle occupant. The gas generator includes an igniter device and gas generant and is structured so that when a car collision happens, the igniter device is brought into action to ignite and burn the gas generant, to thereby generate the large amount of gas rapidly.

The gas generator shown in FIG. 10, taken as an example of the conventional gas generator, is known (Cf. Patent Document 1, for example). The gas generator shown in FIG. 10 comprises a gas generant 102 charging cup 103, an igniter device (squib) 105 comprising an enhancer agent storage holder 105g containing an enhancer agent 105a, and a holder 106 on which the igniter device 105 and the cup 103 are crimped to contain the gas generant 102 in a sealing manner. In the igniter device 105, two electrode pins 105d, standing vertically to allow electricity to pass through under signals from sensors, not shown, are formed to be integral with a body 105b formed of resin. A resistance element 105f is bridged between tips of the electrode pins 105d and is covered with a firing agent 105c contacting with the enhancer agent 105a.

The holder 106 assembled in a seatbelt pretensioner and the like is formed of material resistant to internal pressure, such as iron and aluminum, so that when the gas generator is brought into action, the gas generator can be prevented from being burst as a result of internal pressure.

Also, an O-ring 110 is disposed in a space between the holder 106 and the igniter device 105, to prevent infiltration of moisture from outside. Further, a shorting clip 108 is fitted in the holder 106, to keep the two electrode pins 105d of the igniter device 105 in a short-circuited state, so as to prevent malfunction as a result of static electrical charge and the like.

When the gas generator 101 receives signals from sensors, not shown, the resistance element 105f provided in the igniter device 105 generates heat, first, and, then, the firing agent 105f is fired. Then, the flames of the firing agent 105f fire the enhancer agent 105a, followed by ignition and burning of the gas generant 102 as a result of the flames of the enhancer agent 105a, then generating a large amount of gases rapidly.

As shown in FIG. 10, in the igniter device 105 of the conventional gas generator 101, the resin body 105b and the electrode pins 105d are formed integrally. Also, the electrode pins 105d are previously distorted in the body 105b, to ensure a stable fixation of the electrode pins before and after the action of the gas generator 101.

Patent Document 1: JP Unexamined Patent Application 2001-260815 (FIGS. 1, 12)

DISCLOSURE OF THE INVENTION

Problems to be Solved by the Invention

The conventional gas generator 101 of FIG. 10 has a possible problem that when the gas generator is ignited by being exposed to high temperature, for example, in a vehicle fire at the car collision, the resin body may be softened by the heat, to cause spontaneous ignition of the gas generant in the gas generator, thereby causing the electrode pins to be burst forth.

In addition, since the conventional gas generator 101 requires a lot of processes for the production, it has limitations on cost cut. Particularly, when using gas generant of poor anti-moisture-absorption characteristics, some conventional plastic squibs are required to use an expensive hermetic seal (or preferably a glass hermetic seal having a higher sealing ability) to ensure the sufficient seal.

It is an object of the present invention to provide a gas generator having an improved sealing ability against moisture and the like, at low cost, without using a glass hermetic seal and the like. It is another object of the present invention to provide a structure of the gas generator that can prevent the electrode pins from being burst firth easily even when the gas generator is brought into action as a result of being exposed to high temperature.

Means For Solving The Problem

The present invention has been successful in solving the problems mentioned above by developing a metal holder with electrode pins and a producing method thereof as means for solving the problem and realizing the gas generator having such a metal holder with electrode pins.

The present invention includes some of the following key features to accomplish the objects mentioned above. In the present invention, the following key features are properly used singly or in combination.

The present invention provides a novel metal holder with electrode pins, which comprises a metal holder 5 and at least two electrode pins 4 for allowing passage of electrical current, wherein each electrode pin 4 is larger in diameter at its head portion 4a than at its terminal portion 4b, and plastic members 6 are arranged to surround a part of the respective electrode pins 4 circumferentially, and wherein through holes 23 for the respective electrode pins 4 to pass through the holder 5 are formed in the holder 5, and the electrode pins 4 are fixed to the holes 23 via the plastic members 6, each hole 23 having a diameter-reduction portion 23a at a part thereof.

This arrangement does not require the baking process in the production, differently from the arrangement of the glass hermetic seal. This can provide the results: (i) a soft metal having a low melting point, such as aluminum, which is generally machined with ease, can be used for forming the holder, so that the cost of the metal holder 5 can be reduced, and (ii) since there is no need to consider coefficients of linear expansion between the electrode pins 4 and the metal holder 5 and the glass, differently from the glass hermetic seal, any proper material can be selected. Also, since the electrode pins 4 are each machined so that their head portions 4a can be made larger in diameter than their terminal portions 4b, the electrode pins 4 can be prevented from being burst forth easily even when the gas generator is brought into action under high temperature, as compared with the conventional structure.

In addition, since the electrode pins 4 are fixed in the holes 23 through the plastic members 6, the metal holder 5 can be insulated from the electrode pins 4. Further, as a result of the diameter-reduction portions 23a partly arranged in the holes 23 being formed in such a manner that the holes 23 are partly reduced in diameter by pressing the holder 5 at around the holes 23, the plastic members 6 are also deformed and reduced in diameter. Due to this, the electrode pins 4 can be fixed and sealed in the holes 23 easily. The plastic members 6 of insulation are used.

In the metal holder with electrode pins of the present invention, it is preferable that each electrode pin 4 has a constricted portion 4c in a part thereof located in the hole 23.

This arrangement can provide the structure to prevent the electrode pins 4 from being burst out easily from the gas generator. This can also provide good seal against moisture, in cooperation with the portions of the holder 5 deformed by the diameter-reduction portions 23a.

In the metal holder with electrode pins of the present invention, it is preferable that material of the plastic member 6 is a super engineering plastic.

With this arrangement, the portions of the holder 5 deformed by the diameter-reduction portions 23a are resistant to stress relaxation and keep resilience, so that good seal against moisture can be provided to cause little change with age. Also, this arrangement can provide the structure to further effectively prevent the electrode pins 4 from being burst out easily from the gas generator. Further, this arrangement can also provide a good mechanical strength under high temperature so that when the gas generant is spontaneously ignited by being exposed to high temperature, for example, in a vehicle fire, the electrode pins 4 can be prevented from being burst forth.

In the metal holder with electrode pins of the present invention, it is preferable that the holder 5 has, at its portions around the holes 23, pressed portions 27.

The pressed portions 27 are formed by pressing the portions of the holder 5 around the holes 23 by a pressing device such as a pressing machine. Using the resultant deformation, the diameter-reduction portions can be provided in the holes 23 easily.

In the metal holder with electrode pins of the present invention, it is preferable that the head portion 4a of the each electrode pin 4 has a diameter larger than an inner diameter of the diameter-reduction portion 23a of the hole 23 and smaller than a center-to-center dimension between the two electrode pins 4. The center-to-center dimension between adjacent electrode pins 4 is about 3.1 mm in the gas generator used for the seatbelt pretensioner, depending on the standard for a terminal used.

This arrangement can further ensure that the electrode pins 4 can be prevented from being burst out in the vehicle fire, for example. Also, an adjustable range of an effective length of the resistance element can be varied easily by varying the diameters of the head portions 4a of the electrode pins 4.

In the metal holder with electrode pins of the present invention, it is preferable that the holder 5 is provided, at a portion thereof on the side closer to an igniter portion 8, with a cylindrical projecting portion 5c surrounding the igniter portion 8, and a firing agent 8a is filled in an inner space surrounded by the projecting portion 5c.

With this arrangement, since the firing agent 8a can be charged by simply filling the firing agent 8a in the space surrounded by the projecting portion 5c, the formation of the igniter portion 8 can be facilitated further. When this arrangement is used as part of the gas generator, a large amount of firing agents 8a can be charged with ease. Accordingly, a reliable ignition to the gas generant can be provided even when the enhancer agent 9 and the enhancer agent holder 10 are omitted.

In the metal holder with electrode pins of the present invention, it is preferable that the holder 5 is provided, at a portion thereof on the side closer to an igniter portion 8, with a cylindrical projecting portion 5c surrounding the igniter portion 8 and a cover 30 is arranged in an opening edge portion of the projecting portion 5c, and further an enhancer agent 9 is filled in an inner space surrounded by the projecting portion 5c.

This arrangement can provide the result that when this arrangement is used as part of the gas generator, the enhancer agent holder 10 can be omitted, thus enabling cost cut.

In the metal holder with electrode pins of the present invention, it is preferable that the electrode pins 4 and the plastic members 6 are integrally formed using an injection molding.

This configuration of the integral injection molding can provide the result that the length and the positional relation of the plastic members 6 to the electrode pins 4 can be held constant and, as a result, variations in positions of the electrode pins 4 and the plastic members 6 to the holes 23 can be reduced to provide improved dimensional stability. In other words, pre-adjustment in location of the plastic members 6 can then be facilitated. For example when the location of the plastic members 6 is pre-adjusted so that the plastic members 6 are not displaced toward the terminal portions of the electrode pins 4, there can be provided the result that even when static electricity is applied between the electrode pins 4 and the holder 5, a possible electrostatic spark to the igniter portion 8 side can be suppressed or prevented. As a result, a possible erroneous ignition caused by the static electricity mentioned above can be inhibited or prevented easily. Also, since the electrode pins and the plastic members are formed as a unit, the number of production processes can be reduced.

Also, the present invention provides a novel method of producing a metal holder with electrode pins comprising the step that after plastic members 6 having holes are inserted in holes 23 formed in the metal holder 5, electrode pins 4 are inserted in the holes of the plastic members 6, and the step that the metal holder 5 is pressed at portions thereof around both opening portions of the holes 23 in a depth direction thereof so that the plastic members 6 can be partly reduced in diameter to fix the electrode pins 4.

This construction can provide the result that the metal holder with electrode pins can be produced simply and easily.

A method of producing a metal holder with electrode pins according to another aspect of the present invention comprises the step that after electrode pins 4 are inserted in holes of plastic members 6 having holes or after the plastic members 6 and the electrode pins 4 are integrally formed using an injection molding, the plastic members 6 are inserted in holes 23 formed in the metal holder 5, the plastic members 6 are inserted in the holes 23 formed in the metal holder 5, and the step that the metal holder 5 is pressed at portions thereof around both opening portions of the holes 23 in a depth direction thereof so that the plastic members 6 can be partly reduced in diameter to fix the electrode pins 4.

This construction can provide the result that the metal holder with electrode pins can be produced simply and easily.

By forming the plastic members 6 and the electrode pins 4 integrally using the injection molding, the length and the positional relation of the plastic members 6 to the electrode pins 4 can be held constant and, as a result, variations in positions of the electrode pins 4 and the plastic members 6 to the holes 23 can be reduced to provide improved dimensional stability. In other words, pre-adjustment in location of the plastic members 6 can then be facilitated. For example when the location of the plastic members 6 is pre-adjusted so that the plastic members 6 are not displaced toward the terminal portions of the electrode pins 4, there can be provided the result that even when static electricity is applied between the electrode pins 4 and the holder 5, a possible electrostatic spark relative to the igniter portion 8 side can be suppressed or prevented. As a result, a possible erroneous ignition caused by the static electricity mentioned above can be inhibited or prevented easily. Also, since the electrode pins and the plastic members are formed as a unit, the number of production processes can be reduced. Thus, according to this method of the present invention as well, the metal holder with electrode pins having these effects can be produced simply and easily.

Also, the present invention provides a novel gas generator comprising a cup 3 packed with gas generant 2 to be burnt to generate gases, at least two electrode pins 4 for allowing passage of electrical current, an igniter portion 8, and a holder 5 joined to the cup 3 to seal up the gas generant 2, wherein the electrode pins 4 and the holder 5 form the metal holder with electrode pins of the invention, and wherein the igniter portion 8 has a resistance element 7 interconnecting head portions of the electrode pins 4 and a firing agent 8a formed at least around the resistance element 7.

With this construction, improved seal against moisture can be provided and also the gas generator having the structure to prevent the electrode pins 4 from being burst out easily from the gas generator even when the gas generator is brought into action under high temperature can be provided at low cost.

In the gas generator of the present invention, it is preferable that the cup 3 and the holder 5 are connected with each other by welding.

This arrangement can provide further improved seal against moisture and improved strength of the joining portions. Although in the known holder 106 of FIG. 10, a groove for the cup 103 to be crimped must be formed, since the gas generator of the present invention can eliminate the need to form such a groove, the holder can be produced at low cost. Further, since no burrs are produced when the cup is crimped, various kinds of contamination resulting from the burrs, including, for example, contamination to production equipment, packing material, module in which the gas generator is assembled can be prevented.

It is preferable that the gas generator of the present invention has an enhancer agent holder 10, placed in the cup 3, for containing an enhancer agent 9.

This construction can protect the igniter portion 8, while containing the enhancer agent.

It is preferable that the gas generator of the present invention has an insulating member 11 on a surface of the holder 5 on the side thereof closer to the igniter portion 8.

This construction can allow the igniter portion 8 to have improved resistance against static electricity. It can also provide the result that when the plastic members 6 protrude from the holes 23 of the holder 5, the insulating member 11 can reduce or make up a level difference between the protruded edges of the plastic members 6 on the side thereof closer to the igniter portion 8 and the surface of the holder 5 on the side thereof closer to the igniter portion 8, facilitating the formation of the igniter portion 8.

In the gas generator of the present invention, it is preferable that a cap 14 is arranged to cover an outer portion of an enhancer agent holder 10 on the side thereof closer to gas generant 2.

This arrangement can provide the result that even when the enhancer agent holder 10 formed of resin is used, since notches 14a provided in the cap 14 can allow flames of the enhancer agent 9 burnt in the interior of the gas generator 204 to be sent to the gas generant 2 with higher directivity, the gas generant 2 can be ignited further reliably and effectively by the flames of the enhancer agent 9.

In the gas generator of the present invention, it is preferable that joining portions of the holder 5 and an opening edge of the cup 3 being joined are located in a surface of the holder 5 on the side thereof closer to the igniter portion 8, and the joining portions are joined together by welding, by friction stir welding, or by adhesive bonding.

This arrangement can provide the result that even when the lateral side of the holder 5 is stressed, for example, during the assembling of the holder in the module, the joining portions can be prevented from being disengaged, so such a stress does not have an influence on reliability of the joining portion.

Effects of the Invention

The present invention constructed as mentioned above can provide improved seal against moisture and the like, without using the glass hermetic seal. This can allow the use of the gas generant having high moisture-absorption characteristics, while providing a reduced number of parts. By virtue of these synergistic results, the gas generant can be produced at low cost. In addition, the gas generator can be allowed to have the structure to prevent the electrode pins from being burst forth when the gas generator is brought into action under high temperature and can also provide improved resistance to the vehicle fire and the like.

BEST MODE FOR CARRYING OUT THE INVENTION

In the following, an embodiment of a metal holder with electrode pins of the present invention, an embodiment of a producing method thereof, and an embodiment of a gas generator are explained with accompanying drawings.

The metal holder with electrode pins according to the present invention has a closed-end cylinder shape. FIG. 1 is an axial sectional view of the metal holder with electrode pins according to this embodiment.

In FIG. 1, the metal holder with electrode pins 101 according to this embodiment has at least two electrode pins 4 for allowing the passage of electrical current through the metal holder 5. Each electrode pin 4 has a head portion 4a having a diameter larger than that of a terminal portion 4b and a predetermined wall thickness, and a cylindrical plastic member 6 is arranged to surround a part of the side of the electrode pin 4 circumferentially. The holder 5 is made of metal, having holes 23 for the respective electrode pins 4 to pass through. The electrode pins 4 are fixed to the holes 23 via the plastic members 6.

The holder 5 has a substantially closed-end cylindrical shape, having two holes 23 for the electrode pins 4 to pass through and be fixed therein. The plastic members 6 are arranged between the electrode pins 4 and the holder 5. Thickness of a bottom portion 5b of the holder 5 is properly determined by a required strength and a required sealing property of the holder 5.

The holder 5 is crimped onto the plastic members 6 in a direction indicated by arrows so that the holes 23 can be plastically deformed so that their diameters can be reduced.

As a result of this crimping, the electrode pins 4 and plastic members 6 inserted in the holes 23 of the holder 5 are fixed to the holder 5. Preferably, the holes 23 of the holder 5 have an inner diameter of about 2 mm before reduced in diameter. In the holder usually used in the gas generator for the seatbelt, the two holes 23 are spaced about 3.1 mm apart, which depends on the standardized size of the terminals used.

Also, the holder 5 is provided, at a portion thereof on the terminal 4b side, with a recess 5a having a depth corresponding to a length of a protruded portion of the plastic member 6 so that a shorting clip (not shown) can be inserted in the holder 5, without causing interference with the protrusion portion of the plastic member 6. When some means for avoiding the interference with the protrusion portion is provided in the shorting clip used when the gas generator is assembled using this metal holder with electrode pins, there is no need to provide the recess 5a in the holder.

The materials that may be used for the holder 5 include metals such as, for example, iron, stainless steel, aluminum, and brass. The molding methods that may be used include, for example, pressing, forging, and cutting. A relatively soft metal, such as aluminum, is preferably used in terms of easiness of the cutting work and the like.

FIG. 2 shows an enlarged drawing of a fixed portion of the electrode pins 4 and the plastic members 6. As shown in FIG. 2, the electrode pins 4 are inserted in through holes of the cylindrical plastic members 6, respectively. Then, the plastic members 6 are inserted in the holes 23 of the holder 5. Each plastic member 6 has a short cylinder shape having the through hole. An outer diameter of the hole of the plastic member 6 is determined depending on an inner diameter of a hole 23 of the holder 5, and an inner diameter of the same is determined depending on an outer diameter of a terminal portion 4b of the electrode pin 4. A length of the plastic member 6 is properly determined by required strength and sealing ability. The material of the plastic member 6 is required to have insulation performance. An engineering plastic (a continuous operating temperature of not less than 100° C., a tensile strength of not less than 50 MPa, a bending strength of not less than 2.5 GPa) is preferably used. Among others, a super engineering plastic is preferably used. The super engineering plastic indicated here is the one having the properties of a continuous operating temperature of not less than 150° C. and resistant to stress relaxation. Specifically, the super engineering plastics that may be used include, for example, polysulfone, (PSU), polyether sulfone (PES), polyphenylene sulfide (PPS), polyalylate (PAR), polyamide imide (PEI), polyether imide (PEI), polyether ether ketone (PEEK), polyimide (PI), liquid crystalline polymer (LCP), and fluorocarbon polymer. Among others, PEI and PEEK having the property of a continuous operating temperature of not less than 200° C. is of preferable in view of the mechanical strength under the terms of high temperature.

The holder 5 has, at its portion around the holes 23, pressed portions 27 which are shaped by being pressed in an axial direction (a direction indicated by arrows) of the plastic member 6 by a pressing device (not shown) and plastically deformed to correspond to the shape of the pressing device. As a result of this, the holes 23 of the holder 5 are also plastically deformed and partly reduced in diameter at 23a and then the plastic members 6 are deformed to correspond to the diameter-reduction portion 23a. As a result, the electrode pins 4 and the plastic members 6 are held in the holder 5 in a sandwiched relation in the holes 23. Although it is usual that two electrode pins 4 are provided, three or more electrode pins 4 may be provided for intended purposes. The electrode pins 4 and the plastic members 6 may be integrally formed using the injection molding. In the case of being integrally formed by the injection molding, the length and the positional relation of the plastic member 6 to the electrode pins 4 can be held constant and, accordingly, variations in positions of the electrode pins 4 and the plastic members 6 to the holes 23 can be reduced to provide improved dimensional stability. In other words, pre-adjustment in location of the plastic members 6 can then be facilitated. For example when the location of the plastic members 6 is pre-adjusted so that the plastic members 6 are not displaced toward the terminal portions of the electrode pins 4, there can be provided the result that even when static electricity is applied between the electrode pins 4 and the holder 5, a possible electrostatic spark to the igniter portion 8 side can be suppressed or prevented. As a result, a possible erroneous ignition caused by the static electricity mentioned above can be inhibited or prevented easily. Also, since the electrode pins and the plastic members are formed as a unitary construction, the number of production processes can be reduced.

A diameter of the terminal portion 4b of the each electrode pin 4 is properly determined, though it is usually about 1 mm. The electrode pins 4 are formed of conductive material, such as, for example, stainless steel, carbon steel, and nickel, and may be plated with gold and the like. The electrode pins 4 are electrically insulated from the holder 5 by the plastic members 6. The head portion 4a of the electrode pin 4 is lager in diameter than the terminal portion 4b of the same. The diameter of the head portion 4a is usually about 2 mm. A thickness of the head portion 4a is properly determined depending on the diameter of the electrode pin 4 and the material thereof, though it is preferable that it is usually in the range of about 0.3 mm to about 0.6 mm.

Also, the each electrode pin 4 has at least one constricted portion 4c in a part thereof located in the hole 23. In FIGS. 1 and 2, the electrode pin 4 has two constricted portions 4c. The details of the constricted portion 4c, such as the shape and quantity, are properly determined depending on a required strength and a required sealing ability.

The head portion of the electrode pin 4 usually projects from a surface of the holder 5 on the side on which the head portion 4a of the electrode pin 4 is located. The projecting height is usually in the order of about 1-3 mm, depending on the production requirements and a required space for the countermeasure against static electricity.

Now, the producing method of the metal holder with electrode pins according to the present invention is as follows. First, the plastic members 6 having the holes are inserted in the holes 23, respectively. Then, the electrode pins 4 are inserted in the holes of the plastic members 6. The electrode pins 4 may be inserted in the holes in the plastic members 6 before the plastic members 6 are inserted in the holes 23 of the holder 5. Alternatively, the plastic members 6 and the electrode pins 4 may be integrally formed by using the injection molding before the plastic members 6 are inserted in the holes 23 of the holder 5. Then, the metal holder 5 is pressed at portions thereof around the holes 23 in an axial direction (indicated by arrows). As a result, portions 23a of the holes 23 are reduced in diameter and the electrode pins 4 are fixed. Specifically, after the metal holder 5 is set on a pressing device and then the plastic members 6 and the electrode pins 4 are inserted in the holes 23 of the holder 5, the metal holder 5 is depressed at around the holes 23. A shape of the pressing device and a pressing force are properly determined depending on the required strength and the required sealing ability. This sealing system does not require the baking process in the production, differently from the glass hermetic seal. Accordingly, a soft metal having a low melting point, such as aluminum, can be used for the holder, so the working process of the metal holder can be facilitated and thus the cost of the metal holder 5 can be reduced.

The gas generator according to the first embodiment of the present invention has a generally columnar shape. FIG. 3 is an axial sectional view of the gas generator according to the first embodiment.

In FIG. 3, the gas generator 201 according to this embodiment has the metal holder with electrode pins mentioned above, which incorporates an igniter portion 8 therein, a cup 3 containing gas generant 2 to be burnt for generation of gases, and an enhancer agent holder 10 interposed between the holder 5 and the cup 3. Installation can be made by the way of providing a flange portion 10 in the enhancer agent holder 10 and holding the flange portion 10 in sandwich relation between the holder 5 and the cup 3, as shown in FIG. 3. A side surface of the holder 5 and an end portion 3c of an opening of the cup 3 are joined together by welding. Although the joining can be done not only by welding but also by crimping the end portion 3c of the opening of the cup 3 onto the side surface of the holder 5, the welding is preferably used in terms of moisture proof.

The igniter portion 8 has a resistance element 7 connecting between head portions 4a of the electrode pins 4, and a firing agent 8a formed around at least part of the resistance element 7. The head portions 4a of the electrode pins 4 usually project from a surface of the holder 5, so that the firing agent 8a can be allowed to adhere to the electrode pins 4 so strongly that it can be effectively prevented from being dropped off due to some environmental factors, such as vibration impact. The firing agent 8a may be covered with a film-formable resin, such as a silicon resin, in order to maintain the shape of the enhancer agent further stably.

The materials used for forming the cup 3 include metals, such as, for example, iron, stainless steel, aluminum, copper, and braze. The processes used for forming the cup 3 include processes, such as, for example, pressing, casting, forging, and cutting. The cup 3 has one or more linear notches 3b formed in the bottom 3a. When the gas generant 2 packed in the cup 3 is burnt, the notches 3b are broken to release the generated gases therefrom.

The materials of the enhancer agent holder 10 include, for example, resins, such as polybutylene telephthalate, polyethylene telephthalate, polyamide, polyphenylene sulfide, polyphenylene oxide, polyethylene imide, polyether imide, polyether ether ketone, and polyether sulfone, and combinations thereof containing glass fibers, carbons, and the like. The processes used for forming the enhancer agent holder 10 include, for example, the process of the material of the enhancer agent holder being injected in the mold. Also, the materials used for forming the enhancer agent holder 10 include metals, such as, for example, iron, stainless steel, aluminum, copper, and braze. The processes used for forming the holder 10 include processes, such as, for example, pressing, casting, forging, and cutting. The cup 10 has one or more linear notches 10c formed: in the bottom 10b. When the enhancer agent 9 packed in the enhancer agent holder 10 is burnt, the notches 10c are broken and high temperature gases and frames are discharged therefrom into the cup 3.

When the material used for forming the enhancer agent holder 10 is metal, an insulating cup formed of resin may be arranged on the inside of it. The plastics cited above may be used as the material of such an insulating cup. Also, such an insulating cup may be formed to be integral with the enhancer agent holder 10 by the injection molding or may be formed by forming a steel plate coated with the resin into the enhancer agent holder 10.

Preferably, an enhancer agent comprising a fuel component, an oxidizing agent component and at least one additive is used for the enhancer agent according to this embodiment. The fuel components that may be used include at least one material selected from the group consisting of sodium picramate, boron, titanium hydride, zirconium, and aluminum. The oxidizing agent components that may be used include at least one material selected from the group consisting of potassium perchlorate, potassium nitrate, strontium nitrate, basic copper nitrate, and copper oxide.

The additives that may be used include binders. The binders that may be used include at least one material selected from the group consisting of Viton rubber, nitrocellulose (cellulose nitrate), silicon resin, methyl cellulose, carboxymethyl cellulose, water-soluble cellulose ether, and polyethylene glycol. The enhancer agent comprising boron as the fuel component, potassium nitrate as the oxidizing agent component, and Viton rubber as the binder can be cited as a preferable combination of the enhancer agent. Further, the enhancer agent comprising 10-60 weight % boron as the fuel component, 40-90 weight % potassium nitrate as the oxidizing agent component, and 0.1-10 weight % Viton rubber as the binder can be cited as a further preferable enhancer agent.

To prevent operational error of the igniter portion that may be caused by static electricity and the like, a shorting clip (not shown) to keep the electrode pins 4 a shorted state is fitted to the terminal portions 4b of the electrode pins 4. The shorted state of the electrode pins is released when the gas generator is built in the seatbelt pretensioner.

The gas generant 2 used with the gas generator 201 according to this embodiment is packed in the interior of the cup 3, without any intermediary of filter and/or coolant. The gas generants that may be used include smokeless gunpowder, composite propellant, and composite gunpowder. Of these powders, the smokeless gunpowder has been used as the gas generant used for the seatbelt pretensioner so far. However, from the standpoints of generation of carbon monoxide harmful to humans in the combustion gas and environment resistance (heat resistance, in particular), the composite gas generant essentially containing the fuel component and oxidizing agent component of heat resistance and designed in consideration of oxygen balance is preferably used.

The fuel components that may be used include, for example, nitrogenous organic compounds, such as tetrazole derivative, guanidine derivative, bitetrazole derivative, triazole derivative, hydrazine derivative, triazine derivative, and azodicarboneamide derivative, and metal complexes. The oxidizing agent components that may be used include, for example, metal oxides, metal peroxides, and compounds of chlorate, perchlorate, nitrate, or nitrite, of ammonium, alikali metal, or alkali earth metal. In addition to these, a binder, a slug forming agent, a molding auxiliary substance, a chlorine neutralizing agent, and any components that can contribute to performance boost, such as a combustion catalyst and the like, may be added as the additive.

Specifically, the fuel component that may be used include, for example, at least one material selected from the group consisting of 5-aminotetrazole, guanidine nitrate, and nitroguanidine. The oxidizing agent component that may be used include, for example, at least one material selected from the group consisting of strontium nitrate, ammonium nitrate, potassium nitrate, ammonium perchlorate, potassium perchlorate, and basic copper nitrate. When ammonium perchlorate is used as the oxidizing agent component, it is preferable that a chlorine neutralizing agent is also added, for the purpose of removing hydrogen chloride or chlorine generated by the burning of the gas generant. The chlorine neutralizing agents that may be used include, for example, nitrate salt, oxide, carbonate, etc. of alkali metal or alkali earth metal. Others may be used, as long as they can form metal chloride of the other metals.

The binders that may be used include, for example, at least one material selected from the group consisting of hydroxypropyl methylcellulose, polyacrylamide, polyvinylpyrrolidone, guar gum, methyl cellulose, carboxymethyl cellulose, water-soluble cellulose ether, and polyethylene glycol. The additives that may be used include, for example, metal oxides, such as copper oxide, iron oxide, zinc oxide, molybdenum trioxide, and cobalt oxide, silicon dioxide, silicon nitride, talc, clay, acid clay, and kaolin.

It is a preferable combination of the gas generant that comprises nitroguanidine as the fuel component, strontium nitrate and ammonium perchlorate as the oxidizing agent component, and hydroxypropyl methylcellulose and polyacrylamide as the binder. Further, gas generant comprising about 30-50 weight % nitroguanidine as the fuel component, about 25-35 weight % strontium nitrate and about 25-35 weight % ammonium perchlorate as the oxidizing agent component, and about 1-10 weight % mixture of hydroxypropyl methylcellulose and polyacrylamide as the binder can be cited as a further preferable gas generant.

The composite gas generant can be increased in heat resistance by selecting law materials thereof and can allow improved combustion gas components by adjusting the oxygen balance, while on the other hand, it is indicated to have higher moisture-absorption characteristics than common smokeless gunpowder. However, a gas generator which is unsusceptible to the moisture-absorption characteristics of the composite gas generant can be provided by combining the gas generator having the structure of the present invention with the composite gas generant.

Now, operation of the gas generator 201 is described below. When automobile collision is detected by a collision sensor, not shown, the electric current passes through the electrode pins 4. Then, the resistance element 7 generates heat and thereby the firing agent 8a is ignited. Sequentially, flames of the firing agent 8a causes the ignition and burning of the enhancer agent 9. As the burning of the enhancer agent 9 proceeds, the interior of the enhancer agent holder 10 is put in a high-temperature and high-pressure state, such that the preformed notches 10c are broken. As a result, the high temperature gases and the flames are spurted into the cup 3 to ignite and burn the gas generant 2. A large amount of gases generated in the cup 3 by the burning of the gas generant 2 causes an internal pressure of the cup 3 to increase rapidly, so that the notches 3b provided in the bottom 3a of the cup 3 are broken in time to emit the gases therefrom.

Next, the way of mounting the igniter portion 8 on the metal holder with electrode pins is explained below.

The resistance element 7 is connected between the two head portions 4a of the metal holder with electrode pins 4. While the connection of the resistance element 7 is performed by soldering, adhesive bonding of conductive epoxy resin, laser welding, resistance welding, and so on, the resistance welding is usually adopted. Then, the firing agent 8a is adhesively bonded around the resistance element 7. Usually a nichrome wire is used as the material of the resistance element 7. The details thereabout, including the wire diameter and the quality of material, are properly determined depending on the required heat value and strength. The methods that may be used for adhesively bonding the firing agent 8a to around the resistance element 7 include, for example, dipping and dispensing. When coated with a moisture-proof coating, the firing agents 8a can be increased in environment resistance such as, for example, moisture resistance. The materials that may be used for the coating include, for example, silicon.

It is preferable that the composition of the firing agent comprises a component of an oxidizing agent, a component of a reducing agent, and an additive, all of which contain substantially no lead. No particular limitation is imposed on the component of the oxidizing agent, as long as it can properly act as the oxidizing agent when combined with a component of the reducing agent mentioned later. Of known components of the oxidizing agent in the field of the firing agent, the ones containing no lead may be used. Preferably, the oxidizing agent comprises at least one or two materials selected from the group consisting of a copper compound, a perchlorate compound, a chlorate compound, a nitrate compound, and a basic nitrate. Further preferably, the oxidizing agent comprises at least one or two materials selected from the group consisting of basic zinc nitrate, basic cobalt, basic copper nitrate, copper oxide, copper chlorate, copper perchlorate, copper nitrate, and potassium perchlorate.

Also, it is preferable that the component of the oxidizing agent has a particle diameter of not more than 35 μm, or preferably not more than 25 μm, in that the particle diameter of the oxidizing agent has an effect on the ignition time of the igniter device. Preferably, a content ratio of oxidizing agent in the firing agent composition is usually in the range of not less than 10 weight % to not more than 80 weight %, or preferably not less than 15 weight % to not more than 70 weight %, through it is not limited thereto, of course. The oxidizing agent content can properly be varied in dependence on the components of reducing agent and additive used.

No particular limitation is imposed on the metallic powder used as the component of the reducing agent, as long as it can properly act as the oxidizing agent when combined with the oxidizing agent cited above. Of known components of the reducing agent of the components of the firing agent, the ones containing no lead may be used. It is preferable that the reducing agent comprises at least one or two materials selected from the group consisting of zirconium, aluminum, magnesium, magnalium, iron, tungusten, titanium hydride, and boron. Preferably, a content ratio of reducing agent is usually in the range of not less than 15 weight % to not more than 90 weight %, or preferably not less than 20 weight % to not more than 80 weight %, through it is not limited thereto, of course. The reducing agent content can properly be varied in dependence on the components of oxidizing agent and additive used.

The additive may be used without being limited to any particular one, as long as it is generally used in the field of the firing agent. Particularly preferable, a binder is used as the additive. The binders that may be used include, for example, cellulose nitrate, carboxylmethyl cellulose, cellulose acetate, cellulose acetate butyrate, Viton rubber, GAP (Glysidyl Azide Polymer), polyvinyl acetate, silicon binder, and vinyl chloride/polyvinyl isobutylether polymer. Preferably used is vinyl chloride/polyvinyl isobutylether polymer.

Preferably, a binder content in the composition of the firing agent is usually in the range of about not less than 1 weight % to about not more than 20 weight %, or preferably about not less than 2 weight % to about not more than 15 weight %, through it is not limited thereto, of course. The binder content can properly be varied in dependence on the component of the base agent and the component of combustion improver used. Depending on type and amount of the binder selected, the manufacturing process of the enhancer agent and the required environmental resistance for the gas generator are significantly influenced. The binders may be used singly or in combination of two or more. The binder is added for the purpose of adhesion and fixation of the firing agent to the resistance element and pins and prevention of falling and breaking of the igniter portion. When an amount of the binder added is more than that, it becomes difficult to dispense to the igniter portion, so that a desired ignition performance of the igniter portion cannot be obtained. On the other hand, when an amount of the binder is less than that, the igniter portion cannot withstand a harsh environment condition to which the gas generator equipped with the igniter portion is exposed, so that it may be broken to make the gas generator inoperative.

In this embodiment, a preferable combination of the composition of the firing agent is the one employing zirconium, basic copper nitrate, and the binder. A zirconium content is preferably in the range of about not less than 15 weight % to about not more than 90 weight %, or preferably about not less than 20 weight % to about not more than 80 weight %. A basic copper nitrate content is preferably in the range of about not less than 10 weight % to about not more than 80 weight %, or preferably about not less than 15 weight % to about not more than 70 weight %. A binder content is preferably in the range of about not less than 1 weight % to about not more than 20 weight %, preferably about not less than 2 weight % to about not more than 15 weight %, or further preferably about not less than about 3 weight % to about not more than 10 weight %.

Further, in this embodiment, another preferable combination of the composition of the firing agent is the one employing zirconium, aluminum, basic copper nitrate, potassium perchlorate, and the binder. A zirconium content is preferably in the range of about not less than 10 weight % to about not more than 60 weight %, or preferably about not less than 20 weight % to about not more than 50 weight %. An aluminum content is preferably in the range of about not less than 1 weight % to about not more than 15 weight %, or preferably about not less than 3 weight % to about not more than 10 weight %. A basic copper nitrate content is preferably in the range of about not less than 5 weight % to about not more than 40 weight %, or preferably bout not less than 10 weight % to about not more than 30 weight %. A potassium percholorate content is preferably in the range of about not less than 10 weight % to about not more than 70 weight %, or preferably about not less than 20 weight % to about not more than 55 weight %. A binder content is preferably in the range of about not less than 1 weight % to about not more than 20 weight %, preferably about not less than 2 weight % to about not more than 15 weight %, or further preferably about not less than about 3 weight % to about not more than 10 weight %.

Next, description is given on the production method of the gas generator 201. A prescribed amount of gas generant 2 is weighed on a scale and then charged in the cup 3 and, then, the enhancer agent holder 10 is fitted in the cup 3, so that a prescribed amount of enhancer agent 9 is charged in the enhancer agent holder 10. Thereafter, the metal holder with electrode pins in which the igniter portion 8 is formed is inserted in the cup 3 and the enhancer agent holder 10. Thereafter, the cup 3 is welded to a lateral side of the holder 5 at the opening 3a, whereby the cup 3 and the enhancer agent holder 10 are fixed to the holder 5. Finally, the shorting clip, not shown, is fitted in the holder.

Then, the gas generator according to the second embodiment of the present invention is described with reference to FIG. 4. The gas generator; according to the second embodiment of the present invention has a generally columnar shape. FIG. 4 is an axial sectional view of the gas generator according to the second embodiment. In the following embodiments, the same reference numerals are applied to corresponding parts to those of the gas generator 201 of the first embodiment illustrated in FIG. 3 and the detailed description thereon is omitted.

The gas generator 202 of this embodiment shown in FIG. 4 differs from the gas generator 201 of the first embodiment shown in FIG. 3 in that an insulating member 11 is arranged on a surface of the holder 5 on the side thereof closer to the igniter portion 8, to prevent improper ignition of the enhancer agent caused by static electrical spark and the like.

A sheet or molded part formed of material, such as, for example, polyethylene terephthalate, polyethylene, polyamide, polystyrene, ABS, and epoxy resin, can be used as the insulating member 11. A paint film of insulation paint can also be cited as an example of the insulating member.

The placement of the insulating member 11 can be made by setting a pre-molded one in place or by molding the sheet or molded part formed of the material cited above together with the metal holder with electrode pins in one piece.

This arrangement can provide improved insulation, so that the possibility of erroneous firing in an electrostatic test and the like can be prevented further. In addition, this arrangement can provide the result that when the plastic members 6 protrude from the edges of the holes 23 of the holder 5, the insulating member 11 can reduce a level difference between the protruded edges of the plastic members 6 on the side thereof closer to the igniter portion 8 and the surface of the holder 5 on the side thereof closer to the igniter portion 8, or can make up such a level difference, to facilitate the formation of the igniter portion 8.

Next, the gas generator according to the third embodiment of the present invention is described with reference to FIG. 5. The gas generator according to the third embodiment of the present invention has a generally columnar shape. FIG. 5 is an axial sectional view of the gas generator according to the third embodiment. In the following embodiments, the same reference numerals are applied to corresponding parts to those of the gas generator 201 of the first embodiment illustrated in FIG. 3 and the detailed description thereon is omitted.

The gas generator 203 of this embodiment shown in FIG. 5 differs from the gas generator 201 of the first embodiment shown in FIG. 3 in that the holder 5 is provided, at a side thereof closer to the igniter portion 8, with a cylindrical projecting portion 5c surrounding the igniter portion 8. The firing agent 8a is filled in an inner space surrounded by the projecting portion 5a. A height of the projecting portion 5a is properly determined depending on the processing of the holder 5 and a required amount of firing agent 8a.

This arrangement can allow the firing agent 8a to be charged with ease by simply filling the firing agent 8a in powdery form or granular form in the space defined by the projecting portion 5c as it is, and as such can allow facilitation of formation of the igniter portion 8. Also, this arrangement can allow a large amount of firing agent 8a to be charged with further ease, and as such can allow reliable ignition for the gas generant even when the enhancer agent 9 and the enhancer agent holder 10 are omitted.

An exposed surface of the firing agent 8a after charged may be coated with a coating agent. Preferably, the coating agent is made of material of moisture-proof and film forming property. For example, silicon can be cited as a preferable coating agent. This can prevent mixture of the firing agent 8a and the gas generant 2 even when the firing agent 8a in powdery form or granular form is used.

Next, the gas generator according to the fourth embodiment of the present invention is described with reference to FIG. 6. The gas generator according to the fourth embodiment of the present invention has a generally columnar shape. FIG.

6 is an axial sectional view of the gas generator according to the fourth embodiment. In the following embodiments, the same reference numerals are applied to corresponding parts to those of the gas generator 201 of the first embodiment illustrated in FIG. 3 and the detailed description thereon is omitted.

The gas generator 204 of this embodiment shown in FIG. 6 differs from the gas generator 201 of the first embodiment shown in FIG. 3 in that a cap 14 is provided on the enhancer agent holder 10, to cover an outer portion of the enhancer agent holder 10 on the side thereof closer to the gas generant 2. The enhancer agent holder 10 is formed of resin, and the materials used for the cap 14 include, for example, iron, stainless steel, aluminum, copper, and brass. The cap 14 is formed by pressing, casting, forging, cutting, or the like.

This arrangement can provide the result that even when enhancer agent holder 10 formed of resin is used, since notches 14*a* provided in the cap 14 can allow flames of the enhancer agent 9 burnt in the interior of the gas generator 204 to be sent to the gas generant 2 with higher directivity, the gas generant 2 can be ignited further reliably and effectively by the flames of the enhancer agent 9. The cap 14 may be integrally formed with the enhancer agent holder 10.

Next, the gas generator according to the fifth embodiment of the present invention is described with reference to FIG. 7. The gas generator according to the fifth embodiment of the present invention has a generally columnar shape. FIG. 7 is an axial sectional view of the gas generator according to the fifth embodiment. In the following embodiments, the same reference numerals are applied to corresponding parts to those of the gas generator 201 of the first embodiment illustrated in FIG. 3 and the detailed description thereon is omitted.

The gas generator 204 of this embodiment shown in FIG. 7 differs from the gas generator 201 of the first embodiment shown in FIG. 3 in that the holder 5 is provided, at a side thereof closer to the igniter portion 8, with a cylindrical projecting portion 5*c* surrounding the igniter portion 8.

The enhancer agent 9 is filled in an inner space surrounded by the projecting portion 5*c*. A height of the projecting portion 5*c* is properly determined depending on the processing of the holder 5 and a required amount of enhancer agent 9. A cover 30 is provided for the projecting portion 5*c*. The provision of the cover 30 can eliminate the enhancer agent holder 10, and as such can allow cost reduction.

The cover 30 may be formed of resin and metal. The enhancer agent 9 in powdery form as well as in granular form may be used. When the enhancer agent in granular form is used, a perforated cover 30 including, for example, a netted cover 30, may be used. The firing agent 8*a* charged may be formed not only in the illustrated shape but also in the shape illustrated in FIG. 5.

Next, the gas generator according to the sixth embodiment of the present invention is described with reference to FIG. 8. The gas generator according to the sixth embodiment of the present invention has a generally columnar shape. FIG. 8 is an axial sectional view of the gas generator according to the sixth embodiment. In the following embodiments, the same reference numerals are applied to corresponding parts to those of the gas generator 201 of the first embodiment illustrated in FIG. 3 and the detailed description thereon is omitted.

The gas generator 206 of this embodiment shown in FIG. 8 differs from the gas generator 201 of the first embodiment shown in FIG. 3 in that the joining portion at which the holder 5 and the opening edge 3*c* of the cup 3 are joined is located in a surface of the holder 5 on the side thereof closer to the igniter portion 8 or in a surface of the holder 5 of a closed-end cylinder shape on the side thereof closer to the bottom 5*b*, rather than in the lateral side of the holder 5. This arrangement can provide the result that even when the lateral side of the holder 5 is stressed, for example, in the assembling work, such a stress does not have an influence on reliability of the joining portion. A groove 5*d* may be formed in the surface of the holder 5 on the side thereof closer to the igniter portion 8. The joining can be made using for example a laser welding, a resistance welding, a friction stir welding, and an adhesive bonding. Any joining method may be used without being limited thereto, as long as it can ensure the sealing property.

Further, as shown in FIG. 9, the cup 3 may be provided with a flanged portion 3*d* at the opening edge and also a groove 5*d* of the same size as the flanged portion 3*d* is provided in the holder, so that the holder 5 and the opening edge of the cup 3 may be joined together. FIG. 9 is an axial sectional view of the gas generator according to the seventh embodiment. Reference numeral 15 indicates the joining portion joined by welding and the like. The same reference numerals are applied to corresponding parts to those of the gas generator 201 of the first embodiment illustrated in FIG. 3 and the detailed description thereon is omitted.

While the sixth and seventh embodiments use the enhancer agent holder 10, variants using neither of the enhancer agent holders 10 shown in FIGS. 5 and 7 may be enabled practically.

EXPLANATIONS OF LETTERS AND NUMERALS

Figure 1:
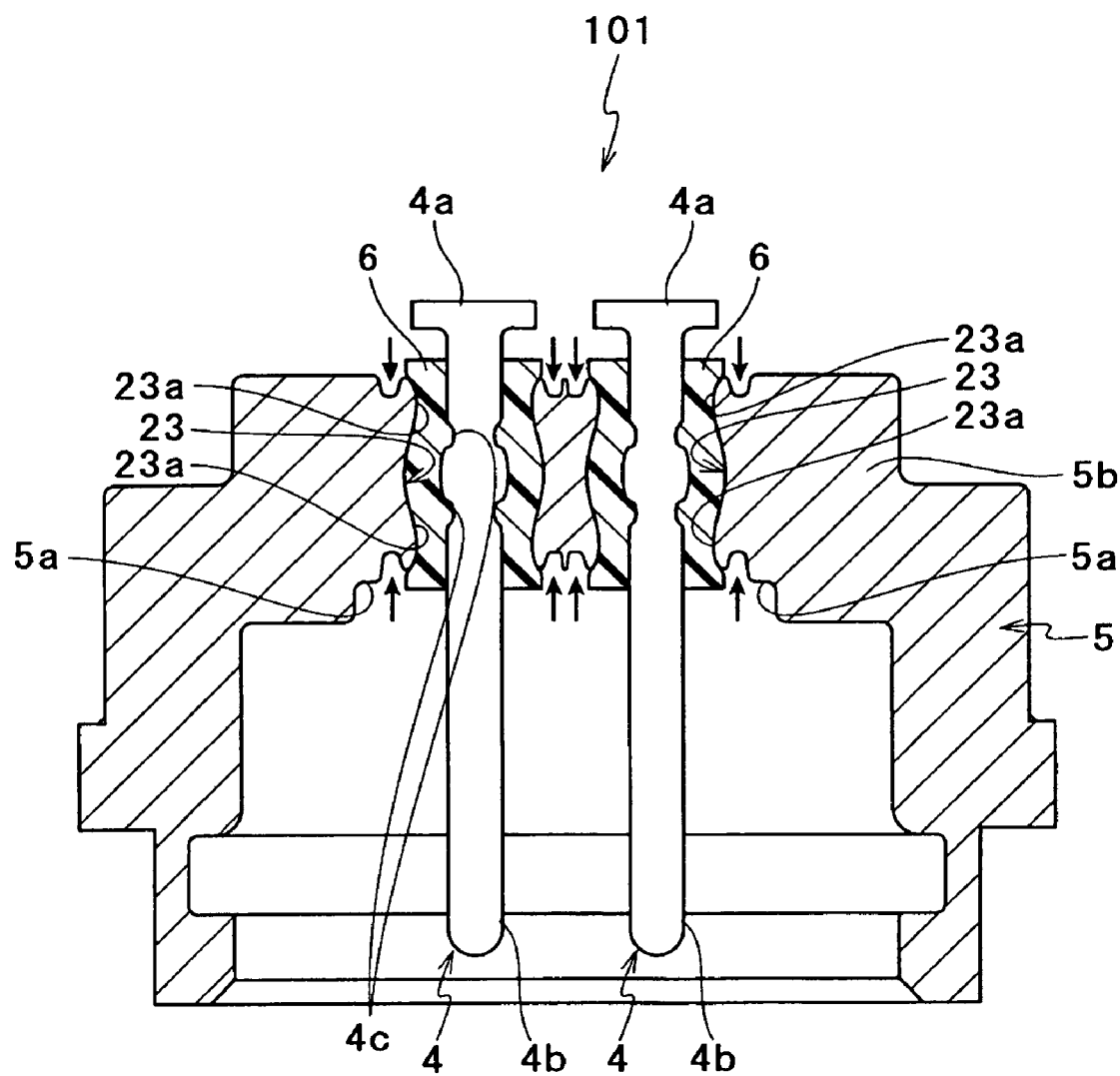
FIG. 1 is an axial sectional view of a metal holder with electrode pins according to the present invention.
Figure 2:
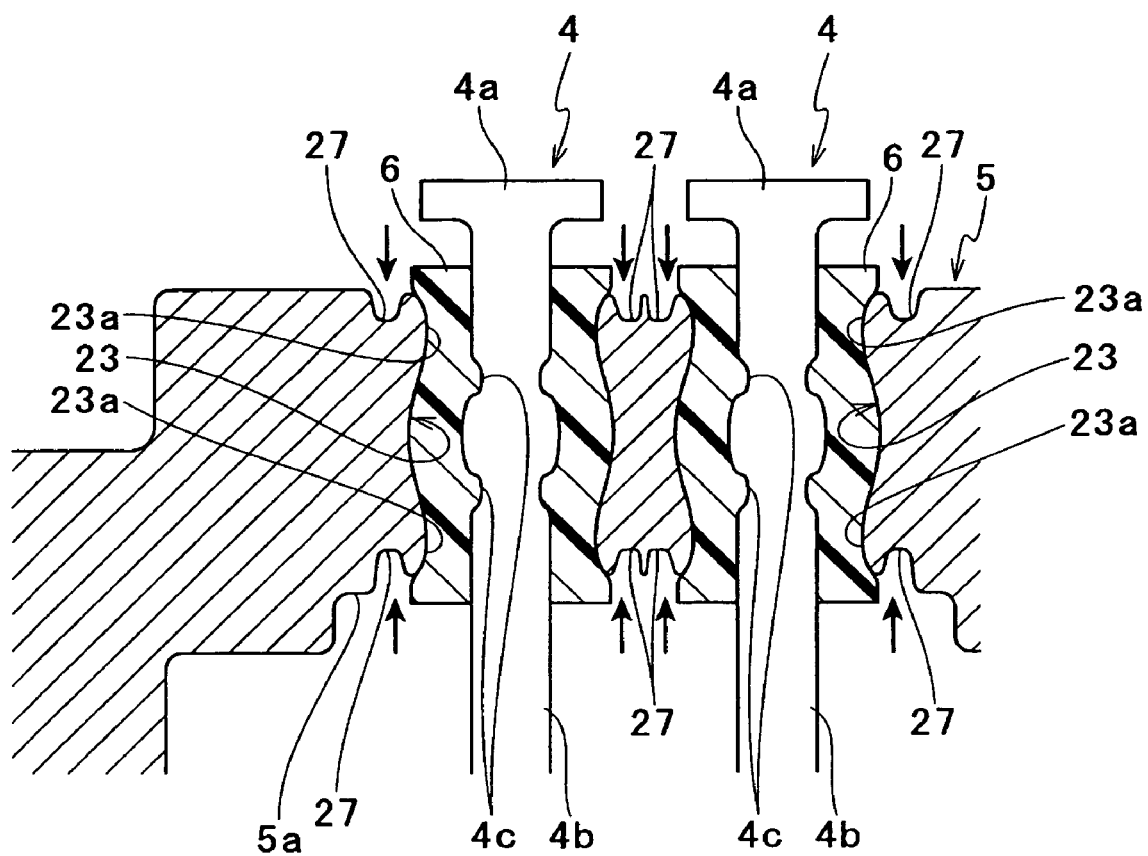
FIG. 2 is an enlarged view of FIG. 1 showing a fixing portion where electrode pins 4 and a plastic member 6 are fixed.
Figure 3:
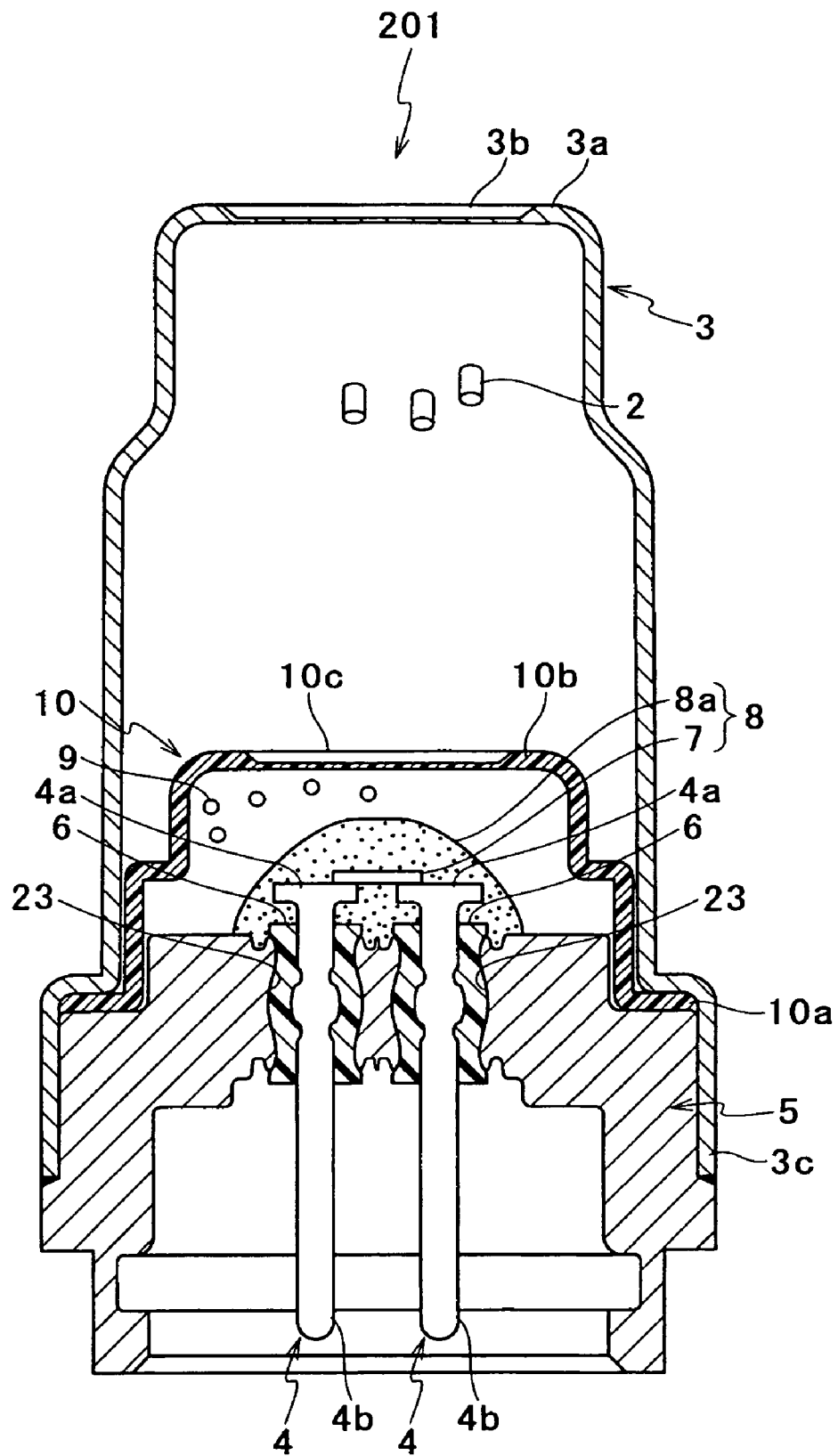
FIG. 3 is an axial sectional view of the gas generator of the first embodiment according to the present invention.
Figure 4:
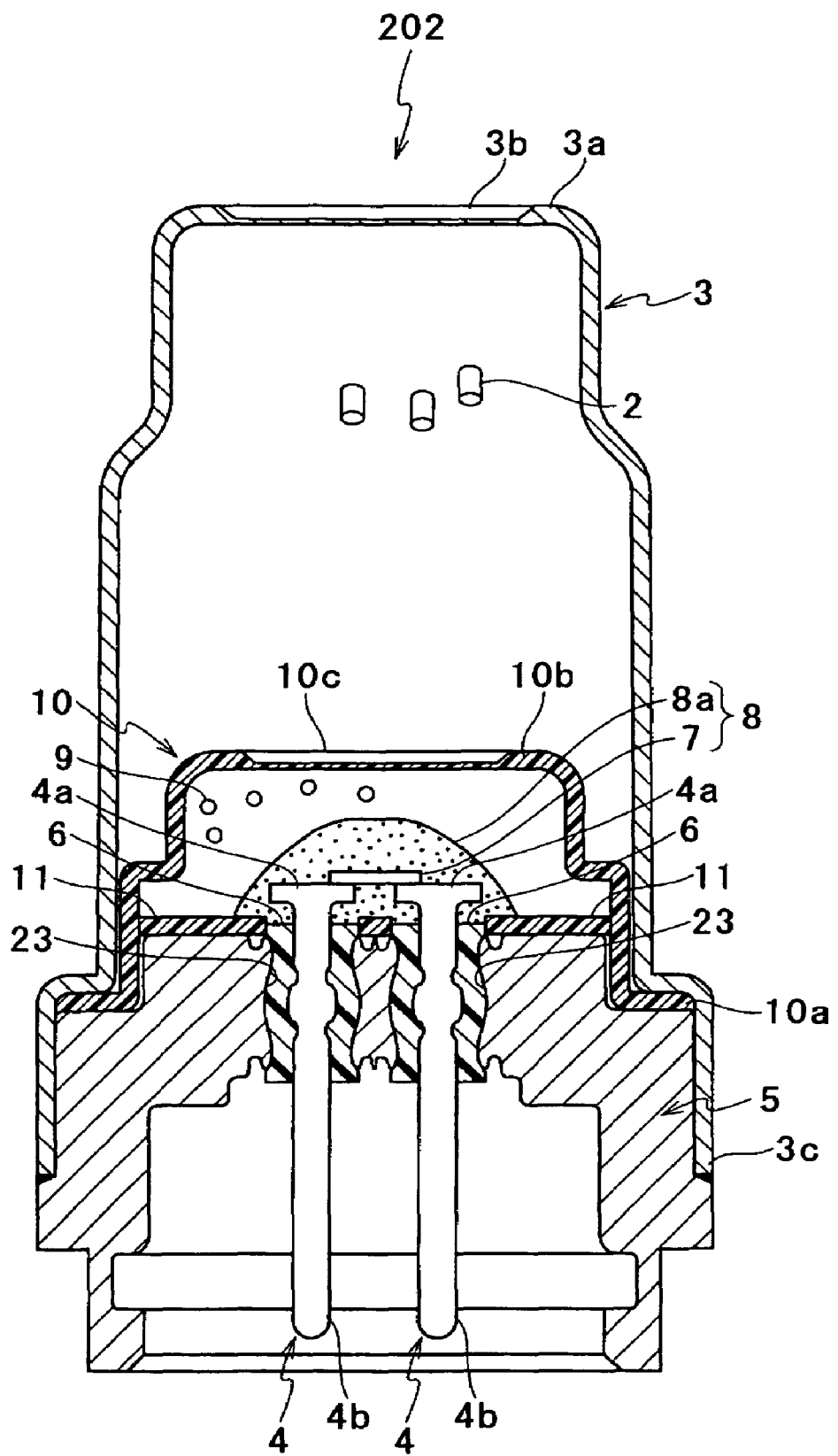
FIG. 4 is an axial sectional view of the gas generator of the second embodiment according to the present invention.
Figure 5:
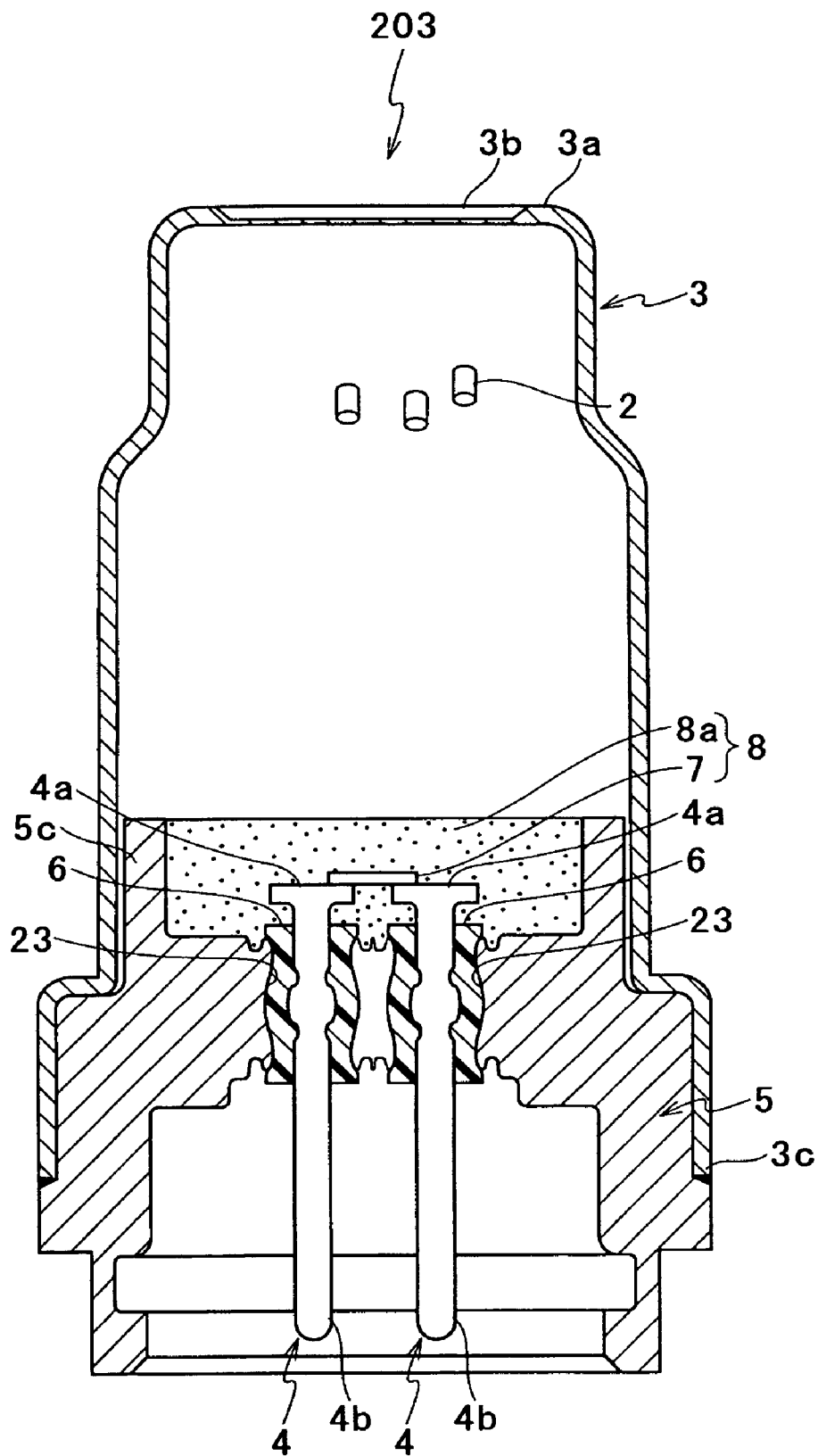
FIG. 5 is an axial sectional view of the gas generator of the third embodiment according to the present invention.
Figure 6:
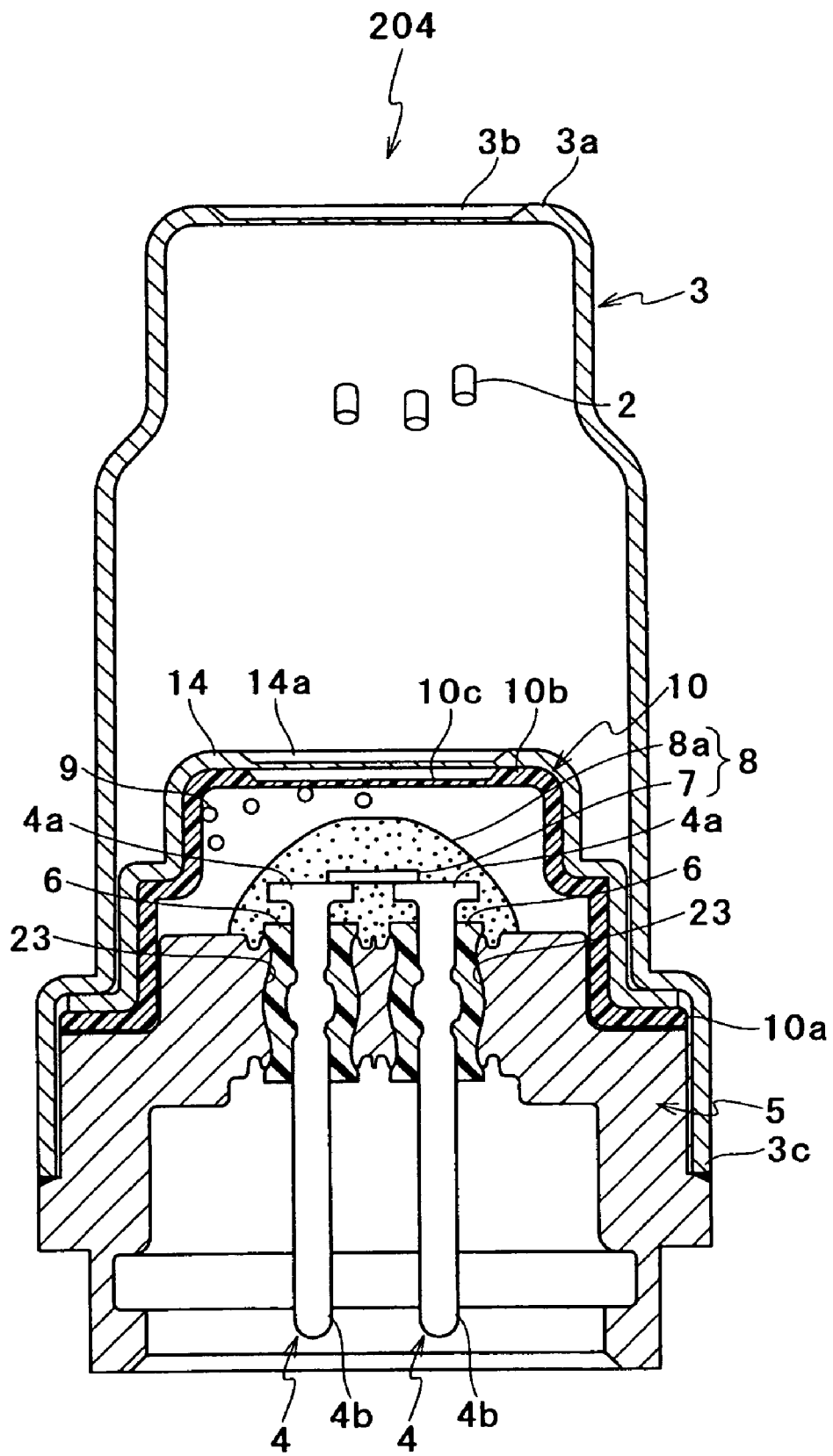
FIG. 6 is an axial sectional view of the gas generator of the fourth embodiment according to the present invention.
Figure 7:
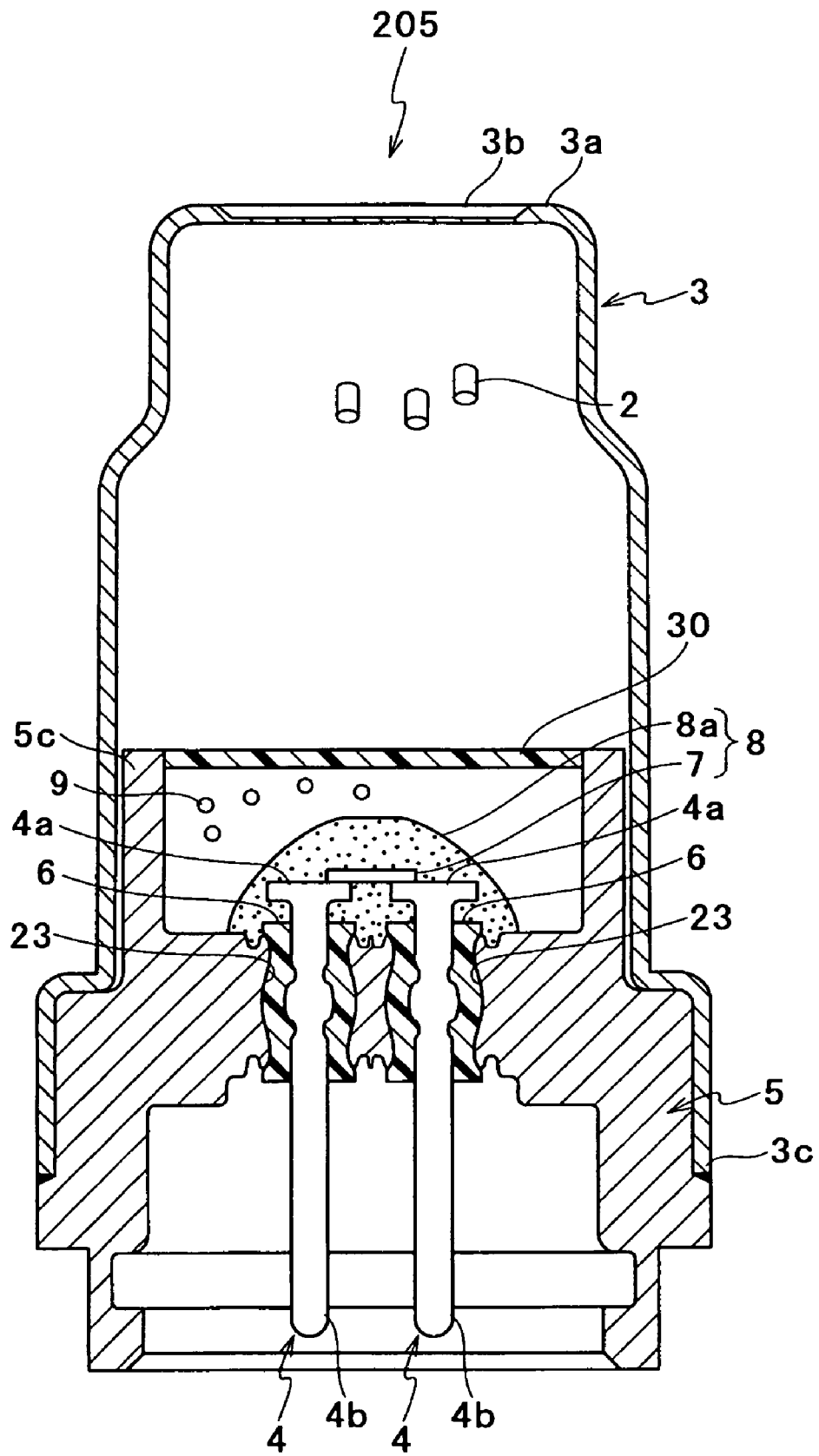
FIG. 7 is an axial sectional view of the gas generator of the fifth embodiment according to the present invention.
Figure 8:
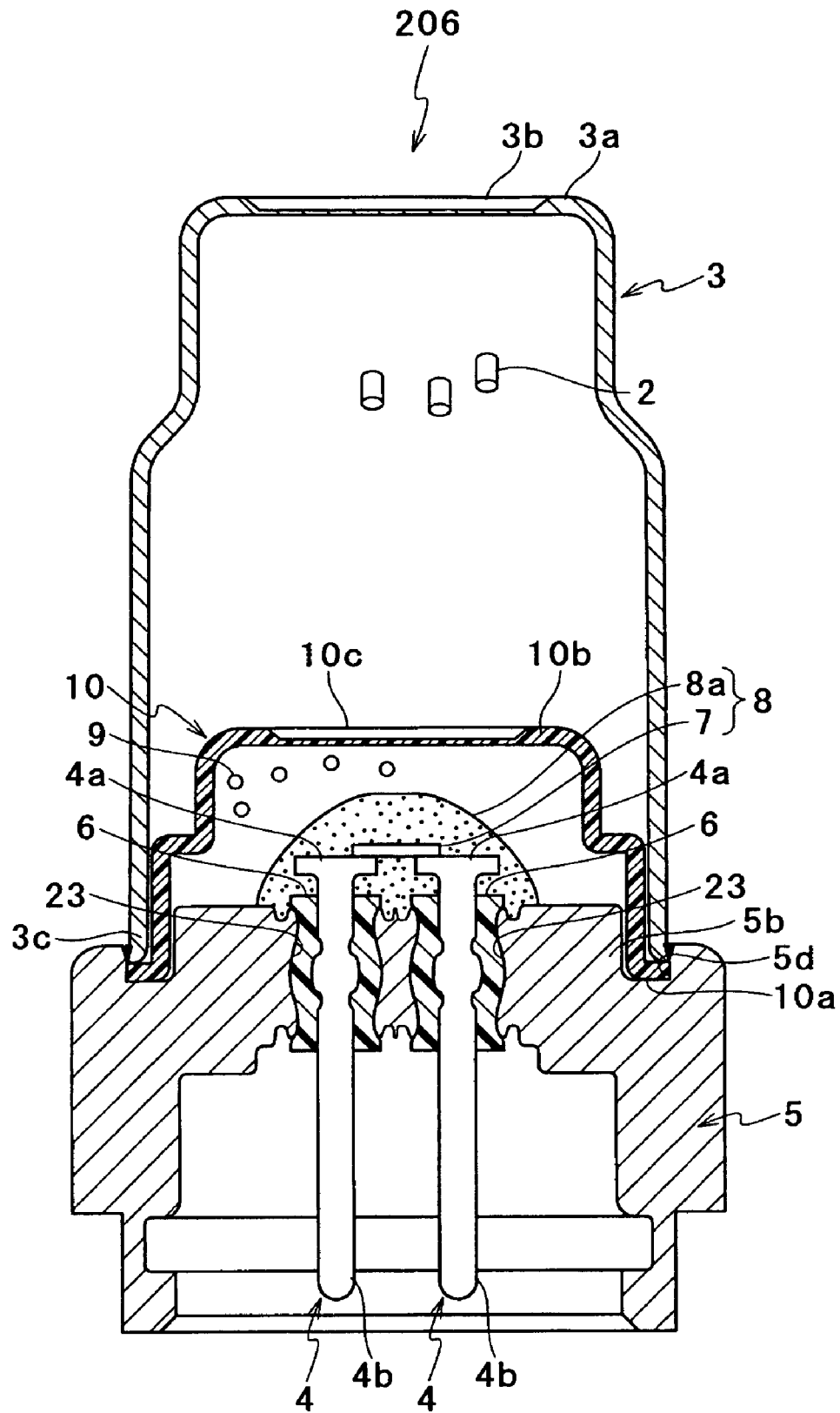
FIG. 8 is an axial sectional view of the gas generator of the sixth embodiment according to the present invention.
Figure 9:
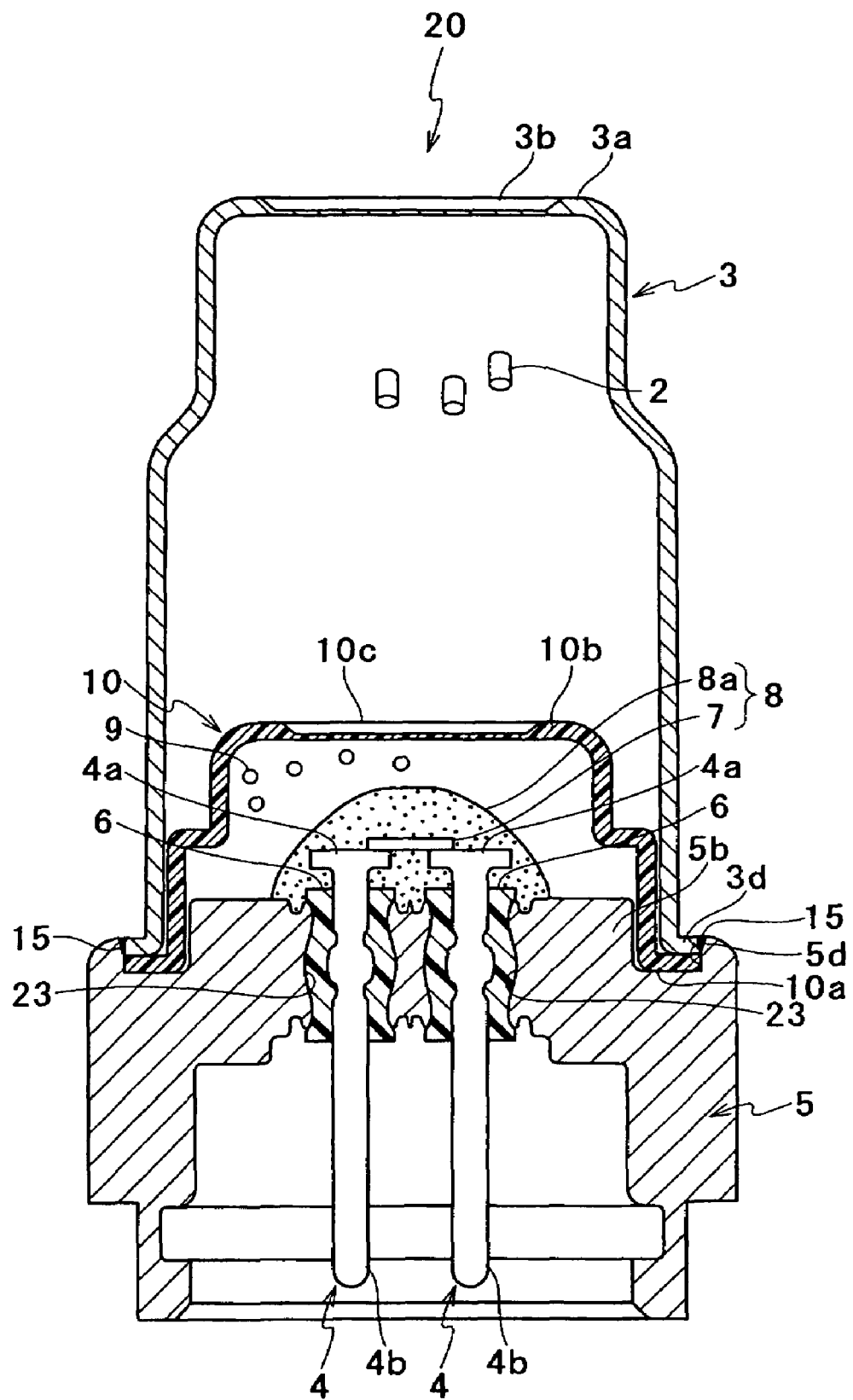
FIG. 9 is an axial sectional view of the gas generator of the seventh embodiment according to the present invention.
Figure 10:
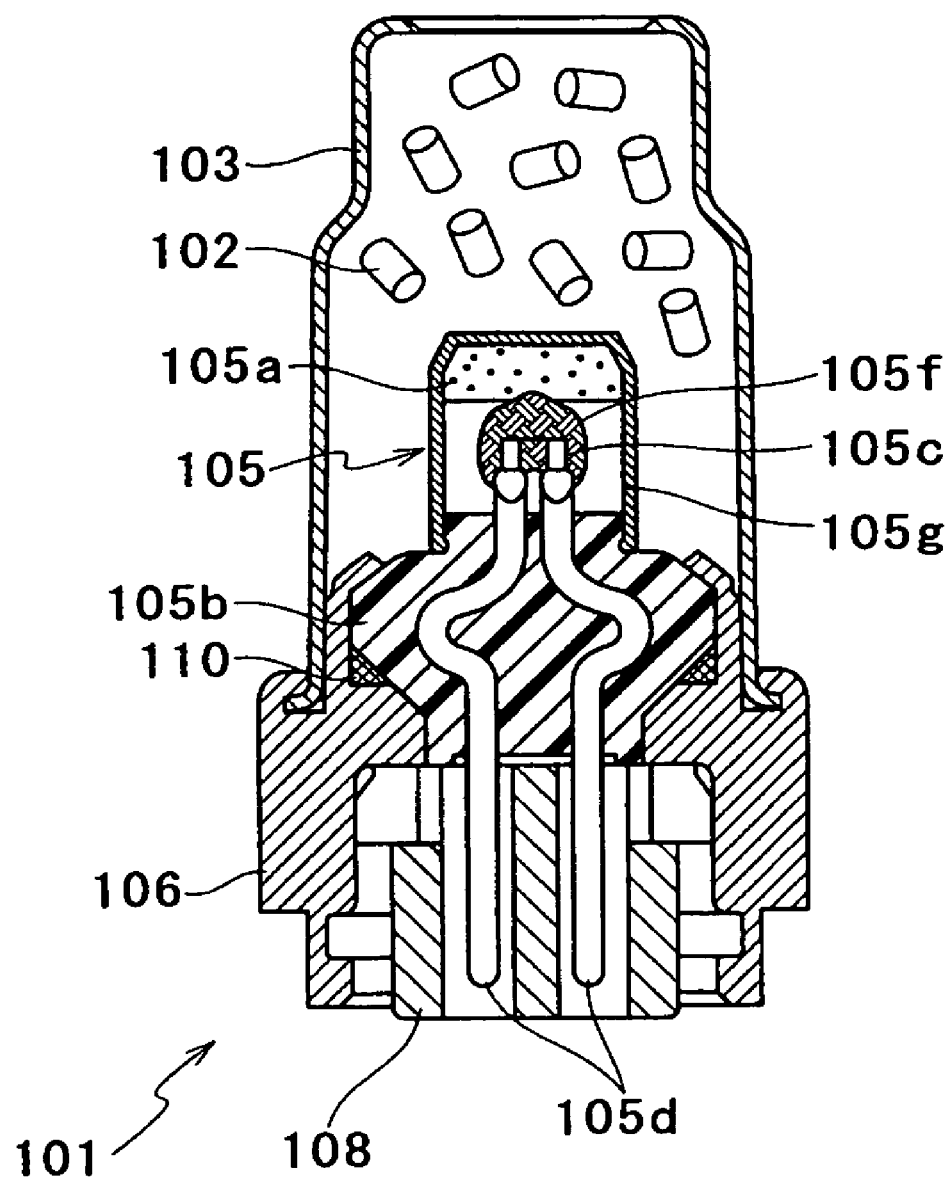
FIG. 10 is an axial sectional view of a conventional gas generator.

101 Metal holder with electrode pins
5 Metal holder
4 Electrode pin
4*a* Head portion
4*b* Terminal portion
6 Plastic member
23 Through hole
23*a* Diameter-reduction portion

The invention claimed is:
1. A metal holder with electrode pins, comprising:
a metal holder and at least two electrode pins for allowing passage of electrical current, wherein each electrode pin is larger in diameter at its head portion than at its terminal portion;

plastic members arranged to contact the respective electrode pins so that the plastic members surround a part of the respective electrode pins circumferentially, and wherein through holes for the respective electrode pins to pass through the holder are formed in the holder, and the electrode pins are fixed to the holes via the plastic members, each hole including a diameter-reduction portion at a part thereof, wherein the plastic members are sandwiched between a part of the holder corresponding to the diameter-reduction portion and the respective electrode pins in the radial direction of the respective electrode pins.

2. The metal holder with electrode pins according to claim 1, wherein the each electrode pin includes a constricted portion in a part thereof located in the hole.

3. The metal holder with electrode pins according to claim 1, wherein a material of the plastic member is a super engineering plastic.

4. The metal holder with electrode pins according to claim 1, wherein the holder includes, at its portions around the holes, pressed portions.

5. The metal holder with electrode pins according to claim 1, wherein the head portion of the each electrode pin has a diameter larger than an inner diameter of the diameter-reduction portion of the hole and smaller than a center-to-center dimension between the two electrode pins.

6. The metal holder with electrode pins according to claim 1, wherein the holder includes, at a portion thereof on the side closer to an igniter portion, a cylindrical projecting portion surrounding the igniter portion, and a firing agent filled in an inner space surrounded by the projecting portion.

7. The metal holder with electrode pins according to claim 1, wherein the holder includes, at a portion thereof on a side closer to an igniter portion, a cylindrical projecting portion surrounding the igniter portion and a cover arranged in an opening edge portion of the projecting portion, and further an enhancer agent filled in an inner space surrounded by the projecting portion.

8. The metal holder with electrode pins according to claim 1, wherein the electrode pins and the plastic members are integrally formed using an injection molding.

9. A gas generator comprising:
the metal holder with electrode pins according to claim 1;
a cup packed with gas generant to be burnt to generate gases; and
an igniter portion,
wherein the holder is joined to the cup to seal up the gas generant, and
wherein the igniter portion includes a resistance element interconnecting head portions of the electrode pins and a firing agent formed at least around the resistance element.

10. The gas generator according to claim 9, wherein the cup and the holder are connected with each other by welding.

11. The gas generator according to claim 9, further comprising an enhancer agent holder, placed in the cup, for containing an enhancer agent.

12. The gas generator according to claim 11, further comprising a cap arranged to cover an outer portion of an enhancer agent holder on the side thereof closer to the gas generant.

13. The gas generator according to claim 9, further comprising an insulating member on a surface of the holder on a side thereof closer to the igniter portion.

14. The gas generator according to claim 9, wherein joining portions of the holder and an opening edge of the cup being joined are located in a surface of the holder on a side thereof closer to the igniter portion, and the joining portions are joined together by welding, by friction stir welding, or by adhesive bonding.

15. A method of producing a metal holder with electrode pins comprising:
after plastic members including holes are inserted in holes formed in the metal holder, electrode pins are inserted in the holes of the plastic members, and
the metal holder is pressed at portions thereof around both opening portions of the holes in a depth direction thereof so that the plastic members can be partly reduced in diameter to fix the electrode pins.

16. A method of producing a metal holder with electrode pins according to claim 15, wherein the plastic members are sandwiched between a part of the holder corresponding to a diameter-reduction portion and the respective electrode pins in the radial direction of the respective electrode pins.

17. A method of producing a metal holder with electrode pins according to claim 16, wherein through holes for the respective electrode pins pass through the holder are formed in the holder, and the electrode pins are fixed to the holes via the plastic members, each hole including a diameter-reduction portion at a part thereof.

18. A method of producing a metal holder with electrode pins comprising:
after electrode pins are inserted in holes of plastic members including holes or after the plastic members and the electrode pins are integrally formed using an injection molding, the plastic members are inserted in the holes formed in the metal holder; and
the metal holder is pressed at portions thereof around both opening portions of the holes in a depth direction thereof so that the plastic members can be partly reduced in diameter to fix the electrode pins.

19. A method of producing a metal holder with electrode pins according to claim 18, wherein the plastic members are sandwiched between a part of the holder corresponding to a diameter-reduction portion and the respective electrode pins in the radial direction of the respective electrode pins.

20. A method of producing a metal holder with electrode pins according to claim 19, wherein through holes for the respective electrode pins pass through the holder are formed in the holder, and the electrode pins are fixed to the holes via the plastic members, each hole including a diameter-reduction portion at a part thereof.

* * * * *